United States Patent [19]
Gupta et al.

[11] Patent Number: 5,058,048
[45] Date of Patent: Oct. 15, 1991

[54] NORMALIZING PIPELINED FLOATING POINT PROCESSING UNIT

[75] Inventors: Smeeta Gupta, Saratoga; Robert M. Perlman, San Jose, both of Calif.; Thomas W. Lynch; Brian D. McMinn, both of Austin, Tex.

[73] Assignee: Advanced Micro Devices, Inc., Sunnyvale, Calif.

[21] Appl. No.: 503,819

[22] Filed: Apr. 2, 1990

[51] Int. Cl.$^5$ .............................................. G06F 7/38
[52] U.S. Cl. ................................................... 364/748
[58] Field of Search ................. 364/748, 715.04, 736.5

[56] References Cited

U.S. PATENT DOCUMENTS

| | | | |
|---|---|---|---|
| 4,075,704 | 2/1978 | O'Leary | 364/748 |
| 4,683,547 | 7/1987 | DeGroot | 364/748 |
| 4,766,564 | 8/1988 | DeGroot | 364/748 |
| 4,825,400 | 4/1989 | Simoncic et al. | 364/748 |
| 4,910,267 | 2/1990 | Birman et al. | 364/748 |
| 4,943,940 | 7/1990 | New | 364/748 |

OTHER PUBLICATIONS

"Pipeline Control in Pre-Norm Logic", IBM Technical Disclosure Bulletin, vol. 30, No. 1, Jun. 1987, pp. 79-86.
"IEEE Standard for Binary Floating-Point Arithmetic", *The Institute of Electrical and Electronics Engineers, Inc.*, 1985.

*Primary Examiner*—Dale M. Shaw
*Assistant Examiner*—Long T. Nguyen
*Attorney, Agent, or Firm*—Johnson & Gibbs

[57] ABSTRACT

A floating point processor for performing arithmetic operations on floating point numbers includes a first arithmetic operation unit configured to operate on normalized numbers and a second arithmetic operation unit which includes a denormalizer for denormalizing normalized numbers and a normalizer for normalizing denormalized numbers. Each arithmetic operation unit has first and second inputs for receiving first and second operands, respectively, and an output for transmitting a result of the arithmetic operation. When an denormalized operand is presented as an input to the arithmetic operation unit configured to operate on normalized numbers, the denormalized input operand is redirected through the second arithmetic unit for normalization of the denormalized operand. The first arithmetic operation unit then performs its arithmetic operation using the normalized input operands. The result of the arithmetic operation is then analyzed to determine whether it has a zero or negative exponent. If the result has a zero or negative exponent, the result is directed through the second arithmetic unit a second time so that the result is denormalized. The denormalized result is then output.

42 Claims, 1 Drawing Sheet

NORMALIZING PIPELINED FLOATING POINT PROCESSING UNIT

CROSS REFERENCE TO RELATED APPLICATIONS

This application is related to the following U.S. patent applications:

| SER. NO. | TITLE | INVENTOR |
| --- | --- | --- |
| 07/503,817 | Pipelined Floating Point Processing Unit | Perlman, et al. |
| 07/504,127 | Arithmetic Unit Having Multiple Accumulators | Tamura, et al. |
| 07/505,351 | Apparatus and Method For Collecting Boolean Conditions of Multiple Operations | McMinn, et al. |
| 07/505,350 | A Special Carry Save Adder For High Speed Iterative Division | Shah, et al. |
| 07/503,818 | High Speed Mixed Radix Adder | Lynch, et al. |
| 07/503,822 | Radix 4 Carry Lookahead Tree and Redundant Cell Therefor | Lynch, et al. |
| 07/504,324 | High Speed Divider With Square Root Option | Lynch, et al. |

All cross references are filed on even date herewith, assigned to the assignee of the present invention and hereby incorporated by reference as if reproduced in their entirety.

BACKGROUND OF THE INVENTION

1. Field of the Invention

The invention relates to a pipelined floating point processing unit and, more particularly, to a pipelined floating point processing unit having a single normalizing means for plural floating point arithmetic units.

2. Description of Related Art

As is known in the art, a floating point number is comprised of an exponent portion and a mantissa portion. The exponent portion represents a power to which a base number such as 2 is raised and the mantissa portion is a number to be multiplied by the base. Accordingly, the actual number represented by a floating point number is the mantissa portion multiplied by the base number raised to a power specified by the exponent portion. In such a manner, any particular number may be approximated in floating point notation as $f \times B^e$ or (f,e) where f is an n digit signed mantissa, e is an m digit signed integer exponent and B is the base number system used. For example, in many computer systems, the base number system used is the binary number system where $B=2$. Other computer systems use the decimal number system ($B=10$) or the hexadecimal number system ($B=16$) as their base number system.

Most floating point numbers may be characterized as either a normalized floating point number or a denormalized floating point number. A normalization scheme for floating point numbers assures that all floating point numbers with the same value have the same representation. One normalization scheme is to ensure that the position of the most significant bit of the mantissa is one. Accordingly, to normalize a denormalized floating point number, the binary point is shifted to the right until the left most digit in the mantissa has a value of one. The exponent is then decreased so that the value of the combination of the mantissa and the exponent remains constant. This procedure is often called "wrapping" because the exponent is often decreased until it "wraps" around zero and becomes negative.

Conversely, a floating point number which is not normalized is denormalized. Thus, in accordance with the normalization scheme set forth above, a floating point number whose leading significand bit is zero is a denormalized floating point number. To denormalize a normalized floating point number, the reverse procedure may be followed. Thus, a typical denormalization process is shifting the decimal point of the normalized number to the left the desired amount and then increasing the exponent until the value of the combination of the mantissa and the exponent is the same.

Floating point numbers may be added, subtracted, multiplied, or divided. Floating point addition can only be performed, however, when the exponents of both input operands are the same. Hence, those operands input an add unit for addition or subtraction which have different exponents must be adjusted to make the exponents coincide. Adjustments to the exponents must be accompanied by shifts in the mantissa in order to keep the values of the operands the same. Typically, the necessary adjustment is made by denormalizing the smaller number. The sum or difference between two input operands may be a denormalized number, so that the add unit is typically associated with a renormalizer for normalizing results.

In a practical computer, however, arithmetic operations are often complicated by the fact that the mantissa portion of a number is not of infinite "precision", i.e. there are not an unlimited number of digits which may be assigned to the mantissa portion of a floating point number. Instead, floating point numbers are normally processed in a register comprising a fixed number of digits. Thus, although two input operands to be added together or subtracted from each other may be exact numbers, the sum or difference after completing the addition or subtraction operation may create more significant digits than the fixed number of digits in the register. As a result, an accurate representation of the sum or difference must be squeezed into the fixed number of digits in the register by the processes of normalizing and rounding.

The limitation that floating point numbers are never of infinite precision makes it very important that the input operands used in floating point multiplication or floating point division are normalized before performing the arithmetic operation. For example, if two floating point numbers, each having an eight bit mantissa, are multiplied together, the result will be a floating point number having a sixteen bit answer. Despite this increase in mantissa size, the number of bits in the output mantissa must be the same as the number of bits in the input mantissas. Thus, to form an output, half of the bits of the answer must be thrown away, typically by deleting the right most bits of the mantissa. If the input operands are not normalized, the answer will not be left justified and bits containing an important part of the answer will be thrown away. If, on the other hand, the input operands are normalized, the answer will be left justified and as little information as possible will be thrown away when producing the output.

Two other problems arise when arithmetic operations are performed using a floating point processing unit. These are the conditions generally referred to as arithmetic "underflow" and arithmetic "overflow". There are two ranges of numbers that correspond to arithmetic overflow and arithmetic underflow, respectively. If the result of an arithmetic operation is greater than the largest positive or less than the least negative value representable, arithmetic overflow occurs. On the other hand, when the result of arithmetic operation is too small to be expressed, either positive or negative arithmetic underflow has occurred.

Overflow occurs whenever the destination formats largest finite number is exceeded in magnitude by what would have been the rounded floating point result. For example, in a floating point multiplication operation where the mantissas are multiplied and the exponents added, if the sum of the exponents exceeds the maximum representable exponent, an overflow has occurred. On the other hand, in a floating point division operation, if the divisor is sufficiently smaller than the dividend, the quotient may exceed the maximum number representable. This too, would be an overflow condition.

Conversely, two correlated events contribute to underflow. One event is the creation of a tiny, non-zero result which cannot be represented as a normalized number. Because it is so small, this number may cause some other exception later such as overflow upon division. The other event is extraordinary loss of accuracy during the approximation of such tiny numbers by denormalized numbers. While underflow and/or overflow conditions may occasionally be produced during addition or subtraction operations, they are most common during floating point multiplication or division operations.

To obtain the fastest possible computational throughput, digital computer architecture often employs pipeline processing techniques. The data to be processed is streamed through the pipeline, thereby obtaining faster processing by a factor that depends upon the number of pipeline stages utilized. Pipelined floating point processor units having multiple arithmetic operation units have been disclosed in the art. For example, U.S. Pat. No. 4,683,547 to DeGroot discloses a data processing system having a multiple floating point arithmetic unit with a putaway at a bypass bus. In the DeGroot apparatus, the results of each multiply/divide operation are passed on to a bypass bus to the input of an adder along with the inputs from the cumulate bypass bus which is the output from the adder for an automatic add operation on an accumulate multiply or accumulate divide operation. This configuration allows two floating point results to be produced each cycle.

U.S. Pat. No. 4,075,704 to O'Leary discloses a floating point data processor comprising a floating point adder, a floating point multiplier and a plurality of memory register means. The floating adder individually drives a first bus for supplying selectable inputs to memory register means, the adder and the multiplier while the floating multiplier individually drives a second bus for also supplying selectable inputs to memory register means, the adder and the multiplier. The adder and the multiplier are provided with individual destination, input busses for receiving selectable outputs from memory register means. The floating adder and the floating multiplier are pipelined circuits each including a plurality of stages with intermediate temporary storage means for catching partial results computed during one clock period for presentation to the next stage during the next clock period.

U.S. Pat. No. 4,766,564, also to DeGroot, is directed to a data processing system which includes multiple floating point arithmetic units such as an adder and a multiplier, two putaway busses and two bypass busses connected to a register file and waiting stages associated with the arithmetic units, respectively. A special source register is included for keeping track of the source of any result in the busses so that the registers may be connected to the appropriate bus on which the result is to appear in the course of a busy or mark bit set in each register in the file and in the waiting stage. As a result, multiple data items are permitted to exit the pipes during any cycle.

It is an object of this invention to provide a floating point processing unit which directs denormalized input operands presented to multiply or divide units to the add/subtract unit for normalization.

It is another object of this invention to provide a floating point processing unit which permits the normalized output of the add/subtract unit to be directed to the input of the multiply or divide units for performing the desired arithmetic operation.

It is yet another object of this invention to provide a floating point processing unit which permits normalized results produced by the multiply or divide unit to be passed to the add/subtract unit so that the results can be denormalized at the conclusion of an operation.

It is still yet another object of this invention to provide a floating point processing unit having add/subtract, multiply and divide units and which minimizes the amount of normalization and denormalization circuitry needed to perform multiply and divide operations by utilizing normalization circuitry included within the add/subtract unit for normalizing both the operands and the results of the multiply and divide units.

It is still yet another object of this invention to promote the pipelining of floating point processor operands and results by providing a floating point processing unit which minimizes the effect of normalizing and denormalizing processes on the overall throughput of the floating point processor.

SUMMARY OF THE INVENTION

In one aspect, the present invention is of a floating point processor for performing arithmetic operations on floating point numbers which includes a first arithmetic operation unit having a pair of inputs for receiving first and second operands and an output for transmitting a result of the arithmetic operation and a second arithmetic operation unit, also having a pair of inputs and an output. The second arithmetic operation unit includes a denormalizer for denormalizing normalized numbers and a normalizer for normalizing denormalized numbers. The first and second operands are also provided to the second arithmetic operation unit where denormalized operands may be normalized. The operands normalized by the second arithmetic operation unit are provided to the first arithmetic operation unit where the arithmetic operation is to be performed. The result of the arithmetic operation may then be provided to the second arithmetic operation unit for denormalization.

In another aspect, the present invention is a floating point processor for performing arithmetic operations on floating point numbers which includes a floating point add unit having first and second inputs, means for denormalizing normalized numbers, means for normalizing denormalized numbers and an output and a floating point multiply unit having first and second inputs and an output. A first input bus is connected to the first input of the add and multiply units and a second input bus is connected to the second input of the add and multiply units. The output of the add unit is connected to an output bus and the output of the multiply unit is connected to the input of the add unit and the output bus. A register file includes at least two input registers for supplying floating point numbers to the input bus and an output register for receiving floating point numbers from the output bus.

In yet another aspect, the present invention is a floating point processor for performing arithmetic operations on floating point numbers which includes a floating point add unit having first and second inputs, means for denormalizing normalized numbers, means for normalizing denormalized numbers and an output, a floating point multiply unit having first and second inputs and an output connected to the round unit input, a floating point divide unit having first and second inputs and an output connected to the add unit input and a round unit having an input connected to the outputs of the add, multiply and divide units and an output connected to the inputs of the add, multiply and divide units. A first input bus transmits a first series of floating point numbers to the first inputs of the add, multiply and divide units for arithmetic operations and a second input bus transmits a second series of floating point numbers to the second inputs of the add, multiply and divide units for arithmetic operations. An output bus connected to the output of the round unit transmits a third series of floating point numbers produced by arithmetic operations from the floating point processor.

In still yet another aspect, the invention is a method of pipelining floating point arithmetic operations. First and second floating point numbers are provided to first and second arithmetic operation units. The provided floating point numbers are then characterized as normalized or denormalized. Normalized floating point numbers are held at the inputs of the second arithmetic operation unit and denormalized floating point numbers are sequentially propagated through the second arithmetic operation unit for normalization. The normalized floating point numbers are then propagated through the first arithmetic unit and the second arithmetic operation performed. The result of the second arithmetic operation is then provided as an output.

BRIEF DESCRIPTION OF THE DRAWINGS

The present invention may be better understood, and its numerous objects, features and advantages become apparent to those skilled in the art by referencing the accompanying drawings in which.

DETAILED DESCRIPTION OF THE INVENTION

Figure 1A:
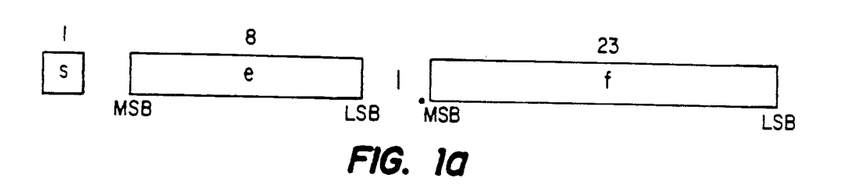
FIG. 1a illustrates the format of a single precision number for processing by a floating point processing unit.

Referring first to FIG. 1a, the format of a 32 bit single precision floating point number shall now be described. The format of the 32 bit single precision number is divided into a one bit sign field "s" which is one for a negative mantissa and zero for a positive mantissa, an eight bit exponent field "e" which is ordered from most significant bit (or "msb") to least significant bit (or "lsb") going from left to right, a so called "hidden" bit which, although not explicity expressed, is assumed to be "1", and a 23 bit fraction field "f", again ordered from msb to lsb going from left to right. Between the hidden bit and the fraction is an implied decimal point which is reproduced in the drawing for illustrative purposes only. Together, the hidden bit and the fraction field make up the mantissa of a single precision floating point number and, together with the exponent field, make up the floating point number itself.

Figure 1B:
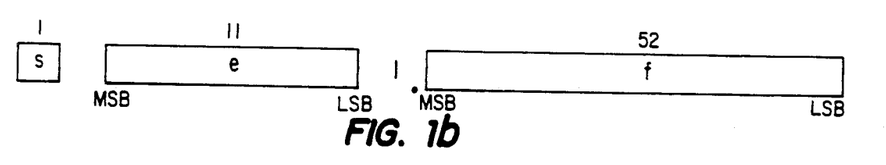
FIG. 1b illustrates the format of a double precision floating point number which may be processed by the floating point processing unit of the present invention.

Referring next to FIG. 1b, the format of a 64 bit double precision floating point number shall now be described. Unlike the single precision floating point number which is capable of operating on a 32 bit bus, the double precision floating point number requires a 64 bit bus. The exponent field of the double precision floating point number is increased to 11 bits and the field portion of the mantissa is increased to 52 bits.

Figure 2:
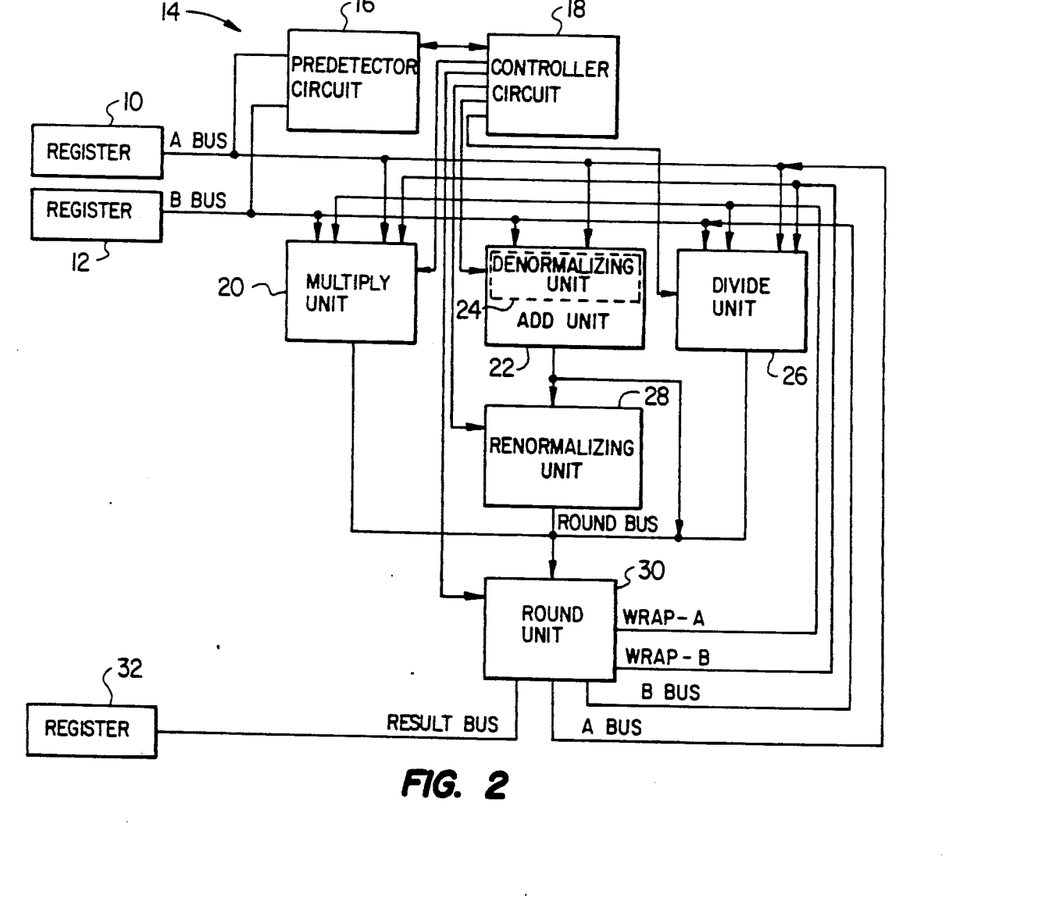
FIG. 2 is a block diagram of a floating point processing system constructed in accordance with the teachings of the present invention.

Referring next to FIG. 2, a normalizing pipelined floating point processing unit constructed in accordance with the teachings of the present invention may now be seen. A pair of 32 bit registers 10, 12 are provided for storing floating point numbers formatted in accordance with the single precision format. For floating point numbers formatted in accordance with double precision format, two 32 bit registers 10 and two 32 bit registers 12 are required to store each floating point number. For ease of description of the arithmetic operations to be performed on the numbers, formatted numbers stored in the register 10 shall hereafter be referred to as "operand A" and formatted numbers stored in the register 12 shall hereafter be referred to as "operand B". The contents of the register 10, i.e. the operand A, is input to a floating point arithmetic processing unit 14 along an A bus. Similarly, the contents of the register 12, i.e. the operand B, is input to the floating point arithmetic processing unit 14 along a B bus. Preferably, the A bus and the B bus should both be 64 bits wide so that arithmetic operations utilizing either a pair of single precision floating point numbers or a pair of double precision floating point numbers may be performed by the floating point processing unit 14.

The floating point arithmetic processing unit 14, which typically includes a plurality of arithmetic operation units for performing a plurality of arithmetic operations on input operands, performs a selected arithmetic operation upon input operands A and B and outputs a result C produced by the selected arithmetic operation to a RESULT bus where the result C may be transferred to a register 32 for storage. Similar to the registers 10, 12, the register 32 is either a single 32 bit wide register for storing single precision numbers or two 32 bit wide registers for storing double precision numbers. Also, in alternative embodiments of the invention, the registers 10, 12 and 32 may either be in separate register files, different memory units within a single register file, or the same memory unit within a single register file.

In the embodiment disclosed herein, the floating point arithmetic processing unit 14 includes a multiply unit 20 for performing floating point multiplication operations, an add unit 22 for performing plural floating point arithmetic operations as to be more fully described later and a divide unit 26 for performing floating point division operations. The divide unit may be configured to perform both division and square root operations such as the divider described in co-pending patent application Ser. No. 07/504,324 entitled "High Speed Divider With Square Root Option" to Lynch, et al., filed on even date herewith and previously incorporated by reference. The multiply unit 20 has a first input connected to the A bus for receiving the operand A from the register 10, a second input connected to the B bus for receiving the operand B from the register 12 and an output for transmitting the product of the operand A and the operand B. Similarly, the divide unit 26 has a first input connected to the A bus for receiving the operand A from the register 10, a second input connected to the B bus for receiving the operand B from the register 12 and an output for transmitting the quotient of the operand A and the operand B. The add unit 22 is a multiple function unit and is configured to perform addition and subtraction, and, if desired, comparisons, conversions, wrapping, unwrapping and other functions. Included as part of the add unit 22 is a denormalizing unit 24, for example, a right shift barrel shifter, for denormalizing normalized numbers. Connected to the output of the add unit 22 is a renormalizing unit 28, for example a left shift barrel shifter, for normalizing denormalized numbers if the exponents of the input operands are the same or differ by one. The renormalizer 28 may have an input connected to the output of the add unit 22 as is illustrated in FIG. 2 or may be incorporated as part of the add unit 22 itself. The output of the add unit 22 is further connected to the input of the round unit 30 via a ROUND bus to permit the selective propagation of the output of the add unit 26 to either the renormalizing unit 28 or the round unit 30.

When the performance of a multiplication or division operation using the operands A and B is desired, the operands A and B are supplied along the A bus and the B bus, respectively, to the inputs of the multiply unit 20 if a multiplication operation is selected, or the inputs of the divide unit 26 if a division operation is selected, and the inputs of the add unit at the same time. While the operands A and B arrive at the inputs of the multiply unit 20 or the divide unit 26 and the add unit 22 at the same time, the propagation of the operands A and B through these arithmetic operation units is controlled by a controller circuit 18. The controller circuit 18 supplies control signals to the multiply unit 20, the add unit 22, the divide unit 26, the renormalizing unit 28 and a round unit 30, which is to be more fully described below, to indicate whether the designated unit should propagate the operand provided to its inputs through the unit without performing the arithmetic operation of the particular arithmetic unit on the operand or operands propagating therethrough, perform the arithmetic operation of the particular arithmetic unit on the operand or operands propagating therethrough or perform operations other than the arithmetic operation of the particular arithmetic unit on the operand or operands propagating therethrough. In addition, the controller circuit is also configured to hold or "stall" operands or results at either the input or the output of an arithmetic unit. In such a manner, the controller circuit 18 controls which arithmetic operations are conducted using the input operands A and B, the order in which such operations would be conducted and the pipelining of plural operands through the floating point processing unit 14 for plural arithmetic operations.

Operands A and B are further input along the A bus and the B input bus, respectively, to a predetector circuit 16 where analysis and partial arithmetic operations are performed utilizing the operands A and B. The predetector circuit 16 provides the results of the analysis and partial arithmetic operations to the controller circuit 18 where the controller circuit 18 will generate a series of control signals to the multiply unit 20, the add unit 22, the divide unit 26, the renormalizing unit 28 and the round unit 30 for controlling the processing and the pipelining of the operands A and B. Typically, the generation of control signals by the controller circuit 18 to the floating point processor 14 will be partially based upon the type and number of arithmetic operations to be performed by the floating point processor 14 and at least partially based upon the analysis of the operands A and B performed by the predetector circuit 16.

The floating point processing unit 14 includes means for determining whether the input operands A and B presented to the inputs of either the multiply unit 20 or divide unit 26 and the add unit 22 are denormalized. While such means may be provided anywhere along the A and B buses, the disclosed embodiment of the invention contemplates including such means as part of the predetector circuit 16. Accordingly, the predetector circuit 16 will first analyze the operands A and B to determine whether the input operands A and B are denormalized in accordance with ANSI IEEE Standard 754-1985 by examining the exponent portion of the input operands A and B. Depending on the particular numbers input as input operands A and B, either both input operands, one of the input operands or neither of the input operands will be determined to be denormalized. Next, based on the respective determinations of the normality of input operands A and B, the controller circuit 18 will modify the routing of the input operands A and B through the floating point processing unit 14.

Typically, numbers are input to the floating point processor 14 along the A bus and the B bus where they are utilized as operands in a desired operation. The controller circuit 18 controls the arithmetic operation performed on the input operands by a series of connections between the controller circuit 18 to the multiply unit 20, the add unit 22 and the divide unit 24, the renormalizing unit 28 and the round unit 30, respectively. The control circuit enables the respective one of the multiply unit 20, the add unit 22 and the divide unit 24, the normalizing unit 28 and the round unit 30 to input one or both of the operands provided at its input and perform its arithmetic operation. In accordance with the teachings of the present invention, however, the control signals further include means to permit the operands to pass or flow through the add unit, the renormalizing unit 28 and the round unit 30, without the unit's arithmetic function being performed upon the input operand.

While the floating point processing unit 14 is configured to perform addition, subtraction, multiplication and division operations upon the input operands, it is the multiplication and division operations which are of particular interest herein. As previously set forth, multiplication and division operations utilizing floating point numbers require that the floating point numbers be normalized. Accordingly, if the predetector circuit 16 determines that either the operand A or the operand B is denormalized, the controller circuit 18 shall control the normalization of the denormalized operands before permitting them to be input to the multiply unit 20 or the divide unit 26. It is contemplated, therefore, that the denormalizing unit 24 and the renormalizing unit 28 associated with the add unit 22 be utilized for the normalization of the input operands to the multiply and divide units 20, 26 and for the denormalization of the results output by the multiply and divide units 20, 26. Furthermore, as new operands are constantly being input to the floating point processor unit 14, the controller circuit 18 minimizes the amount of processing time to normalize operands and denormalize results by scheduling operations according to priority. For example, if an input operand for an add operation and an input operand for a multiply operation require renormalization, the controller circuit 18 will, by appropriate selection of control signals, first select the input operand for the add operation for normalization, thereby preventing significant degradation of the ability of the floating point processing unit 14 to perform addition and subtraction operations as well.

More specifically, in the event that the predetector circuit 16 determines that one of the two operands A and B desired to be input to either the multiply unit 20 or the divide unit 26 is denormalized, the control circuit 18 stalls the normalized operand at the input of the multiply unit 20 or the divide unit 26 by preventing the input of the normalized operand into the multiply unit 20 or the divide unit 26. The denormalized operand is then directed to the add unit 22 for normalization. As is typical with numerous add units of conventional design, the output of the add unit 22 is tied to the input of the normalizing unit 28. In a typical addition or subtraction operation, the normalizing unit 28 would be used to normalize the denormalized sum or difference produced by the add unit 22. Here, the normalizing unit 28 normalizes the input operand which is intended to be used in a multiply or divide operation. Accordingly, the input operand propagates through the add unit 22 without any arithmetic operation being performed thereon and is normalized by the normalizing unit 28. The time needed to normalize a single denormalized operand is N cycles, where N is the latency of the add unit 22. During the normalizing or "wrapping" of the input operand, the entire pipeline is put on hold so that the emulation of precise interrupts, for example those interrupts generated by the controller circuit 18 based upon the calculations performed by the predetector circuit 16, may be maintained.

Having been normalized by the renormalizing unit 28, the normalized input operand is then output by the normalizing unit 28 and continues on to the input of the round unit 30. At this point, an additional one cycle stall of the pipeline is necessary to move the normalized input, as well as any other information, to either the A bus or the B bus. During the one cycle stall, the controller circuit 18 instructs the round unit 30 to propagate the normalized input operand therethrough without further manipulation. Once the normalized input operands are at the output of the round unit 30 and the additional one cycle stall has been completed, the wrapping of the input operands is complete. The pipeline is then restarted and the normalized input operand is sent to the input of either the multiply unit 20 or the divide unit 26, either along the A bus if the originally denormalized input operand was the operand A or along the B bus if the originally denormalized input operand was the operand B. In addition, the fact that the exponent has been wrapped is provided by the WRAP-A and WRAP-B lines, respectively. Once normalized operands A and B are provided at the inputs of either the multiply unit 20 or the divide unit 26, the controller circuit 18 generates an enabling signal to the multiply unit 20 or the divide unit 26 to permit the operands to be input to the selected arithmetic unit and the arithmetic function be performed thereon.

If both the input operand A and the input operand B are denormalized, the method of normalizing input operands before performing either multiply or divide operations must be modified slightly. When both input operands require denormalization, the multiply unit 20 or the divide unit 26 must be stalled for an additional period sufficient to permit the normalization of the second denormalized input operand. As the time required to normalize one operand was N cycles, the time needed to normalize two operands is N+1 cycles. To normalize two denormalized operands, the controller circuit 18 will sequentially direct the denormalized input operand A followed by the denormalized input operand B through the add unit 22 and the normalizing unit 24 to sequentially normalize each input operand. The controller circuit 18 will then direct the propagation of the normalized input operands through the round unit 30. In this case, however, the additional one cycle wait which stalls the pipeline is delayed until both normalized input operands have been propagated through the round unit without any operations being conducted thereon. After the one cycle stall, the serial wrapping of two input operands is complete and the pipeline is restarted. The normalized operands A and B are then provided to the inputs of either the multiply unit 20 or the divide unit 26 and the controller circuit 18 will then enable the selected arithmetic unit to perform the selected arithmetic operation using the normalized input operands A and B.

The normalized input operands A and B are also provided via the A and B buses to the predetector circuit 16. Once the input operands have been normalized, the predetector circuit 16 may then examine the input operands, for example by performing partial arithmetic operations using the input operands, for possible floating point exceptions such as underflow or overflow conditions which would be produced by the selected arithmetic operations. To determine whether potential underflow or overflow conditions would be produced by the result of the multiply or divide operations, the predetector circuit 16 takes the sum and difference of the exponents of the normalized input operands A and B and then, based on the sum and difference of the exponents, determines whether the product or quotient of the input operands may potentially result in either an underflow condition or an overflow condition. If a potential exception such as a potential underflow condition or a potential overflow condition is detected by the predetector circuit 16, the controller circuit 19 shall, through the generation of a series of precise interrupts, serialize the numbers propagating through the pipe by permitting only one number to pass at a time.

Returning to the multiply unit 20 and the divide unit 26, the product or quotient produced by the multiplication or division of operands A and B will often produce a product or quotient having more digits than provided for in the floating point number format. Furthermore, as the width of the data path of the floating point processor unit 14 is 69 bits, the larger number will be easily accommodated. In such cases, the product or quotient must be rounded to the number of digits provided in the floating point number format. Accordingly, the output of the multiply unit 20 and the output of the divide unit 26 are respectively directed to the round unit 30 for rounding. Furthermore, as the sum or difference produced by adding or subtracting a pair of input operands will often also produce a result having more digits than provided in the floating point format, the output of the add unit 22 is directed through the round unit 30 for rounding as well.

If the rounded result does not have a potentially negative or zero representation of the exponent, as determined by the predetector 16, the result is output to the register 32 for storage. If the rounded result has a potentially zero or negative representation of the exponent, the result is transmitted along the A or B bus to an input of the add unit 24 for denormalization. Denormalization is needed because when the result produced by an arithmetic operation has a zero or negative exponent, the result will likely have too many bits to fit into the register 32. Under these circumstances, the controller circuit 13 permits the propagation of the normalized result through the add unit 22 where the denormalizing unit 24 denormalizes the result. The process of denormalizing normalized results, also referred to as "unwrapping", unlike input wrapping, does not typically require any holds on the pipeline since the predetector circuit 16 has already detected any floating point exceptions and held the pipe. Once the result is denormalized by the denormalizer 24, subsequent input operands may be input to the add unit 22 for the performing additional add and/or subtract operations. At this point, the denormalized output from the add unit 22 is propagated through the renormalizing unit 28 and the round unit 30 without further processing and the normalized result is then rounded by the round unit 30 and output along the RESULT bus. Alternately, the normalized output may be propagated along the RESULT bus and either the A bus or the B bus if the normalized output is also required for a next operation.

As can be seen from the above description of the present invention, there is provided a floating point processing unit which reduces the amount of circuitry required by utilizing normalizing and denormalizing units typically associated with an add unit for normalizing denormalized input operands to a multiply unit and a divide unit and denormalizing normalized results produced by the multiply and divide units. When denormalized operands to be input into the multiply or divide units are detected, a controller circuit directs the denormalized input operands through the add unit for normalization. Similarly, when the result produced by an arithmetic operation on the input operands is determined to have a zero or negative exponent, the result will likely have too many bits to fit into the output register. Under these circumstances, the controller circuit directs the result to be again input through the add unit where denormalization of the result is performed so that the result will fit into the register file. In addition to reducing the amount of logic circuitry needed to construct a floating point processing unit by eliminating the need for separate normalizing and denormalizing circuitry to be separately associated with both the multiply and divide units, the present invention further provides a floating point processing unit whereby pipelining may be continued at a high issue rate. It is acknowledged that the utilization of the normalizing and denormalizing units of the add unit for multiply and divide operations degrade the flow of input operands through the add unit for addition and/or subtraction operations. However, the control circuit minimizes the degradation by giving the normalized operands high priority. Furthermore, a series of short stalls in the pipelining of operands through the floating point processing unit further minimizes any possible degradation of the pipelined flow of operands through the add unit caused by the routing of denormalized operands and normalized results therethrough.

However, those skilled in the art will recognize that many modifications and variations besides those specifically mentioned may be made in the techniques described herein without departing substantially form the concept of the present invention. Accordingly, it should be clearly understood that the form of the invention described herein is exemplary only and is not intended as a limitation on the scope of the invention.

What is claimed is:

1. A floating point processor for performing arithmetic operations on floating point numbers having a mantissa portion and an exponent portion, comprising:
a first arithmetic operation unit having first and second inputs for receiving first and second operands, respectively, and an output;
a second arithmetic operation unit having first and second inputs for receiving said first and second operands, respectively, and an output, said second arithmetic operation unit including a denormalizer and a normalizer;
means for providing said first and second operands to said first and second arithmetic operation unit inputs, respectively;
means for determining whether said first and second operands are normalized or denormalized;
means for propagating said first and second operands determined to be denormalized through said second arithmetic operation unit for normalization; and
means for providing said first and second operands normalized by said second arithmetic operation unit to said first arithmetic operation unit, said first arithmetic operation unit performing an arithmetic operation on said first and second normalized operands to produce results for output.

2. A floating point processor as set forth in claim 1 wherein said first input of said first arithmetic operation unit is tied to said first input of said second arithmetic operation unit and said second input of said first arithmetic operation unit is tied to said second input of said second arithmetic operation unit.

3. A floating point processor as set forth in claim 1 further comprising:
means for determining whether said results of said arithmetic operation performed by said first arithmetic operation unit has a zero or negative exponent; and
means for propagating said results having a zero or negative exponent through said second arithmetic operation unit for denormalization.

4. A floating point processor as set forth in claim 3 wherein said denormalizer is a right-shift barrel shifter.

5. A floating point processor as set forth in claim 4 wherein said normalizer is a left-shift barrel shifter.

6. A floating point processor as set forth in claim 3 wherein said first arithmetic operation unit is a floating point multiply unit and said results are products.

7. A floating point processor as set forth in claim 6 wherein said second arithmetic operation unit is a floating point add unit.

8. A floating point processor as set forth in claim 3 further comprising means for detecting a potential overflow or underflow for said results before said first arithmetic operation unit calculates said results.

9. A floating point processor as set forth in claim 8 wherein said potential overflow or underflow detection means further comprises a predetector circuit for determining partial arithmetic results for said first and second operands.

10. A floating point processor as set forth in claim 9 wherein said predetector circuit determines said partial arithmetic result by manipulating said exponent portions of said first and second operands.

11. A floating point processor as set forth in claim 10 further comprising means for serializing the propagation of numbers through said arithmetic units if said predetector circuit detects said potential overflow or underflow conditions.

12. A floating point processor as set forth in claim 3 further comprising means for propagating said first and second operands through said first arithmetic operation unit only when both of said first and second operands are normalized.

13. A floating point processor as set forth in claim 12 wherein said means for propagating said first and second operands through said first arithmetic operation unit further comprises means for stalling the pipelined flow of additional operands through said floating point processor until both of said first and second operands are normalized.

14. A floating point processor as set forth in claim 13 further comprising:
a third arithmetic operation unit having first and second inputs for receiving said first and second operands and an output for transmitting results of arithmetic operations performed by said third arithmetic operation unit; and
means for selectively propagating said first and second operands through said first arithmetic operation unit or said third arithmetic operation unit.

15. A floating point processor as set forth in claim 14 wherein said third arithmetic operation unit is a floating point divide unit and said results of said arithmetic operation performed by said third arithmetic operation unit are quotients.

16. A floating point processor as set forth in claim 15 wherein first arithmetic operation unit is a floating point multiply unit and wherein said first input of said floating point divide unit is tied to said first input of said floating point multiply unit and said second input of said floating point divide unit is tied to said second input of said floating point multiply unit.

17. A floating point processor as set forth in claim 16 wherein said second arithmetic operation unit is a floating point add unit and said floating point processor further comprising means for providing said first and second operands denormalized by said floating point add unit to said first and second inputs of said floating point divide unit corresponding to said first and second operands.

18. A floating point processor as set forth in claim 17 further comprising:
means for determining whether said quotients of said first and second operands have a zero or negative exponent; and
means for propagating said quotients having a zero or negative exponent through said floating point add unit for denormalization.

19. A floating point processor as set forth in claim 18 further comprising means for propagating said first and second operands through said floating point divide unit only when both of said first and second operands are normalized.

20. A floating point processor as set forth in claim 19 further comprising a floating point round unit having an input tied to said outputs of said floating point add unit, said floating point multiply unit and said floating point divide unit.

21. A floating point processor for performing arithmetic operations on floating point numbers, comprising:
a register file having at least two input registers and at least one output register, said input registers holding floating point numbers to be used as input operands in arithmetic operations and said output registers holding floating point numbers produced by said arithmetic operations;
a floating point add unit having first and second inputs and an output, said add unit including means for denormalizing normalized numbers and means for normalizing denormalized numbers;
a floating point multiply unit having first and second inputs and an output, said floating point multiply unit output being connected to at least one of said add unit inputs, said output of said add unit being connected to said first and second inputs of said multiply unit;
a first input bus connecting a first one of said input registers to said first input of said add unit and said first input of said multiply unit;
a second input bus connecting a second one of said input registers to said second input of said add unit and said second input of said multiply unit; and
an output bus connecting said add unit output, said multiply unit output and said output register;
wherein denormalized input operands provided to said multiply unit are propagated through said add unit for normalization and wherein normalized floating point numbers produced by said multiply unit are propagated through said add unit for denormalization.

22. A floating point processor as set forth in claim 21 further comprising:
predetector means for determining whether said floating point numbers stored in said input registers are denormalized; and
means for propagating said denormalized floating point numbers through said floating point add unit for normalization.

23. A floating point processor as set forth in claim 22 wherein said predetector means further comprises:
means for determining whether said floating point numbers produced by arithmetic operations performed by said floating point multiply unit have zero or negative exponents; and
wherein said floating point processor further comprises means for propagating said produced floating point numbers having zero or negative exponents through said floating point add unit for denormalization.

24. A floating point processor as set forth in claim 23 further comprising means for propagating said floating point numbers stored in said input registers through said floating point multiply unit only when all of floating point numbers are normalized.

25. A floating point processor as set forth in claim 24 wherein said means for propagating said floating point numbers stored in said input registers through said floating point mulitply unit further comprises means for stalling the pipelined flow of additional floating point numbers through said floating point processor until both of said floating point numbers stored in said input registers are normalized.

26. A floating point processor as set forth in claim 25 further comprising means for serializing the propagation of numbers through said arithmetic units if said predetector means detects potential overflow or underflow conditions.

27. A floating point processor as set forth in claim 26 further comprising a floating point divide unit having a first input connected to said first input bus, a second input connected to said second input bus and an output connected to at least one of said add unit inputs and said outputs bus.

28. A floating point processor as set forth in claim 27 further comprising means for selectively propagating said floating point numbers stored in said input registers through said floating point add unit, said floating point multiply unit, or said floating point divide unit.

29. A floating point processor for performing arithmetic operations on floating point numbers, comprising:
a first input bus for transmitting a first series of floating point numbers to said floating point processor for arithmetic operations;
a second input bus for transmitting a second series of floating point numbers to said floating point processor for arithmetic operations;
an output bus for transmitting a third series of floating point numbers produced by arithmetic operations from said floating point processor;
a floating point add unit having first and second inputs and an output, said add unit including means for denormalizing normalized numbers and means for normalizing denormalized numbers;
a floating point multiply unit having first and second inputs and an output;
a floating point divide unit having first and second inputs and an output; and
a round unit for rounding floating point numbers, said round unit having an input and an output;
wherein said first add unit input, said first multiply unit input and said first divide unit input are connected to said first input bus;
said second add unit input, said second multiply unit input and said second divide unit input are connected to said second input bus;
said add unit output is connected to said round unit input;
said multiply unit output is connected to said round unit input and at least one of said add unit inputs;
said divide unit output is connected to said round unit input and at least one of said add unit inputs; and
said round unit output is connected to said first input bus, said second input bus and said output bus;
wherein denormalized numbers included in said first series of floating point numbers transmitted to said multiply or divide units of said floating point processor are propagated through said add unit for normalization and wherein normalized numbers included in said third series of floating point numbers output by said mulitply or divide units are propagated through said add unit for denormalization.

30. A floating point processor as set forth in claim 29 further comprising:
predetector means for determining whether said floating point numbers provided at said first and second multiply unit inputs, said first and second divide unit inputs and said first and second add unit inputs are denormalized numbers or normalized numbers;
means for propagating floating point numbers provided at said first and second inputs of said multiply, divide and add units and determined to be denormalized numbers through said add unit for normalization; and
means for holding said floating point numbers provided at said first and second inputs of said multiply, divide and add units and determined to be normalized numbers at said inputs until said denormalized floating point numbers are normalized and propagated to said inputs.

31. A floating point processor as set forth in claim 30 further comprising means for serializing the propagation of numbers through said arithmetic units if the predetector means detects potential overflow or underflow conditions.

32. A floating point processor as set forth in claim 31 wherein said means for propagating said floating point numbers further comprises means for stalling the pipelined flow of additional operands through said floating point processor until both of said first and second operands are normalized.

33. A floating point processor as set forth in claim 32 wherein said floating point number provided at said first and second inputs of said multiply, divide and add units are sequentially propagated through said add unit.

34. A floating point processor as set forth in claim 33 wherein said floating point numbers provided at said first input of said multipy, divide and add units and propagated through said add unit for normalization is again provided to said first input of said multiply, divide and add units and said floating point numbers provided at said second input of said multiply, divide and add units and propagated through said add unit for normalization is again provided to said second input of said multiply, divide and add units.

35. A floating point processor as set forth in claim 34 wherein said predetector means further comprises:
means for determining whether said third series of floating point numbers have zero or negative exponents; and
wherein said floating point processor further comprises means for propagating said normalized floating point number produced by arithmetic operations through said add unit for denormalization.

36. A floating point processor as set forth in claim 35 further comprising means for serializing the propagation of numbers through said arithmetic units if said predetector means detects potential overflow or underflow conditions.

37. In a floating point processor comprised of a first floating point arithmetic operation unit having means for normalizing denormalized numbers and means for denormalizing normalized numbers and a second arithmetic operation unit which operates on normalized floating point numbers, a method of pipelining floating point arithmetic operations comprising the steps of:
providing first and second floating point numbers to said first and second arithmetic operation units;
determining whether said first and second floating point numbers are denormalized;
sequentially propagating said determined denormalized numbers through said first arithmetic operation unit for normalization while holding said normalized floating point numbers at the input of said second arithmetic operation unit;
propagating said normalized floating point numbers through said second arithmetic unit for performing said second arithmetic operation; and
providing a result of said second arithmetic operation as an output.

38. A method of pipelining floating point arithmetic operations according to claim 37 further comprising the step of stalling the pipelined flow of additional operands through said floating point processor until both of said first and second operands are normalized.

39. A method of pipelining floating point arithmetic operations according to claim 38 further comprising the steps of:
determining whether the result of said second arithmetic operation has a zero or negative exponent; and
providing results having said zero or negative exponents to said first arithmetic operation unit for denormalization.

40. A method of pipelining floating point arithmetic operations according to claim 37 futher comprising the steps of:
determining whether the result of said second arithmetic unit is a potential exception; and
serializing the propagation of numbers through said arithmetic units if the result of said second arithmetic unit is a potential exception.

41. A method of pipelining floating point arithmetic operations according to claim 40 wherein said potential exception is a potential underflow.

42. A method of pipelining floating point arithmetic operations according to claim 40 wherein said potential exception is a potential overflow.

* * * * *